Figure 1:
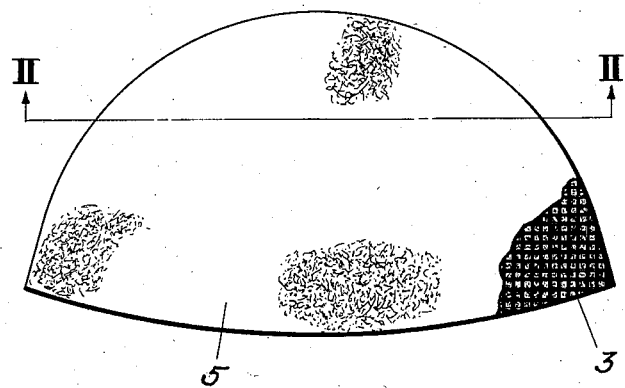

Feb. 19, 1935. L. P. MELLERIO 1,991,464

SHOE STIFFENER AND METHOD OF MANUFACTURE

Filed Sept. 29, 1931

INVENTOR
Lucien P. Mellerio
By his Attorney,
Harlow M. Davis

Patented Feb. 19, 1935

1,991,464

UNITED STATES PATENT OFFICE 1,991,464

SHOE STIFFENER AND METHOD OF MANUFACTURE

Lucien Paul Mellerio, Leicester, England, assignor to United Shoe Machinery Corporation, Paterson, N. J., a corporation of New Jersey Application September 29, 1931, Serial No. 565,891 In Great Britain October 24, 1930

11 Claims. (Cl. 154—2)

This invention relates to shoe stiffeners and methods of manufacturing them.

Shoe stiffeners, such for example as toe stiffeners, which are normally hard and resilient but may be rendered temporarily soft prior to their incorporation in shoes by subjecting them to a softening agent, such as heat or a solvent, are commonly made by impregnating a felt or woven fabric base with a stiffening substance in molten condition or in solution. Hitherto a comparatively expensive grade of felt has been required since it must withstand considerable strains during the pulling-over and lasting operations when the soft and limp stiffener is being conformed to the shape of the toe portion of a last.

In order to lower the cost of stiffeners of the type which are softened prior to being incorporated in shoes, the present invention provides a shoe stiffener comprising a layer of inexpensive fabric, a layer or layers of flimsy, inexpensive felt, and a coat or coats of sizing on the exposed face or faces of the felt layer or layers, the laminated stiffener being impregnated with a stiffening substance.

The illustrated stiffener comprises two layers of flimsy, inexpensive felt having between them a layer of inexpensive open-mesh woven fabric through the interstices of which the fibres of the felt have been worked so as to interlace the fibres during the felting operation, the exposed faces of the felt layers being coated with a sizing such as glue, and the whole stiffener being impregnated with a thermoplastic stiffening substance. With such a laminated stiffener, the felt serves principally to carry a sufficient load of the stiffening substance, and the fabric possesses sufficient strength to withstand the greater part of the strains of the pulling-over and lasting operations. The coatings of sizing, which are not thermoplastic, prevent the stiffener in its softened condition from sticking to the heater on which it is placed to be softened or to the operator's fingers and thereby obviate or greatly lessen the tendency of the layers to become loosened from and displaced with respect to the fabric reinforcement.

The invention also provides a method of making laminated sheet material from which stiffeners of the kind described may be made, this method as herein exemplified comprising felting together in superposed relation a layer of fabric and a layer of felt, and treating an exposed face of the felt with a sizing or bonding substance sufficient to bond together the fibres of the felt at and near the surface thereof but insufficient to affect materially the porosity of the felt. This laminated material impregnated with a stiffening substance provides sheet material from which stiffeners may be died out.

Figure 2:
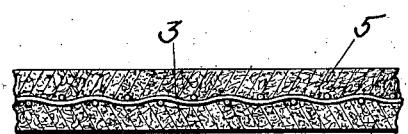

Referring now to the accompanying drawing:

Fig. 1 is a plan of a toe stiffener in which the present invention is embodied; and Fig. 2 is part of a section on an enlarged scale on the line II—II of Fig. 1.

In the illustrated stiffener a reinforcing layer of fabric 3 is located between two layers of felt 5. The felt preferably used comprises wool fibers with a considerable admixture of cotton fibers and is of a much cheaper quality and a much looser texture than the felt hitherto employed, being so loose and open in its texture that daylight may be seen through numerous openings in it.

The illustrated woven fabric is scrim, which is commonly woven in a plain one-to-one weave usually of single-twist cotton threads spaced apart both in the warp and weft about sixteen to eighteen threads to the inch, the average diameter of the threads being .005 in. in the finished base. The scrim is placed between already lightly felted layers of felt material (i. e. felted just sufficiently to be handled as a sheet) and further felting action is then performed upon the materials thus assembled, the normal action of such felting incidentally causing fibres of the felt material on both sides to work partly through the interstices of the scrim and to interlace not only with the threads of the scrim but with one another, making a unitary felted sheet composed of the scrim with a layer of felt of the same thickness on both sides. The humid conditions prevailing during this latter felting operation also incidentally remove most if not all of the size usually present in the scrim so that in the finished material the scrim is as limp and pliable as the felt.

The material in this condition may now be sprayed on both of the exposed faces of the felt with a fine spray of an aqueous solution of a non-thermoplastic sizing or bonding substance such as ordinary glue or starch, or a mixture of glue and rubber latex, and afterward dried. The spraying treatment should be such that the felt portions of the material only at and adjacent their outer surfaces become lightly sized and that to a degree which, while sufficient in the dried product to bond the loose surface fibres well together, does not to any appreciable extent stiffen the treated dried fabric nor materially affect its porosity so as to impede the passage of molten thermoplastic stiffening substance through the treated surface layers of the felt portions into the body of these felt portions and to the scrim core in the subsequent impregnation.

The sizing may, however, be carried out in the course of the manufacture of the laminated sheet material; that is to say, the built-up composite felt and scrim may be sprayed as indicated at some stage in its manufacture when it is already dry enough to admit of effective surface sizing in this way but still so wet that a further drying is in any event called for and may therefore incidentally be availed of to dry off the extra moisture added to the fabric by the spray of sizing solution.

The material, sized in such a way as indicated, may then be charged with a molten thermoplastic stiffening agent, for instance a molten mixture of 90% colophony and 10% Montan wax, and shoe stiffeners cut from the impregnated sheet. The sizing not having appreciably stiffened the material, said material may be fed into an impregnating apparatus from a roll with the same convenience as in the case of any good quality felt; and, as the sizing is not only confined to the surface layers of the felt portions of the laminated material but is not such as to affect to any marked degree the porosity of those surface layers of the relatively open-texture felt portions, the impregnant penetrates well into the material; and the capacity of the material to receive a good charge of thermoplastic stiffening substance is not affected. Both the material, sized as indicated, and the stiffeners made therefrom have a smooth and pleasing surface texture as compared with the somewhat rough, hairy surface of the unsized material and stiffeners made from the latter, while the stiffeners made from the material, sized as indicated, show, when rendered hot and soft for use, little tendency to stick to surfaces on which they may be laid and to the fingers of the operator handling them. Moreover, in spite of the cheap nature of the fabric, its composite structure and its somewhat loose open texture, the stiffeners have to a marked degree the appearance and general characteristics of stiffeners made by the use of good grade and relatively expensive felt.

There has been described above a thermoplastic stiffener and a method of making it which involves the use of a sizing or bonding substance which is not thermoplastic, that is a substance which does not soften when the stiffener is heated. It will be understood, however, that, in case some softening agent other than heat is employed, the sizing or bonding substance used should be such as to resist softening when subjected to the action of the particular agent used to soften the stiffener.

Although the invention has been set forth as embodied in a thermoplastic toe stiffener, having scrim as the reinforcing layer between two layers of felt, it should be understood that the invention is not limited in the scope of its application to the particular materials which have been shown and described.

Having described my invention, what I claim as new and desire to secure by Letters Patent of the United States is:

1. A shoe stiffener comprising a fabric layer, a layer of flimsy felt superposed thereon, and a coat of sizing on one face only of the felt layer sufficient to bond the fibers thereof at and near said face but insufficient either to affect materially the porosity of the felt layer or materially to stiffen said layer, said layers being impregnated throughout with a stiffening substance.

2. A shoe stiffener comprising a layer of woven fabric, two layers of flimsy felt between which the fabric layer is located, and a coat of sizing on each of the two outer faces only of the felt layers sufficient to bond the fibers thereof at and near said faces but insufficient either to affect materially the porosity of the felt layers or materially to stiffen said layers, said three layers being impregnated throughout with a stiffening substance.

3. A shoe stiffener comprising an open mesh woven fabric layer and a layer of flimsy felt, the felt layer having fibers extending through the meshes of the fabric and felted together, and a coat of sizing on one face only of the felt layer sufficient to bond the fibers thereof at and near said face but insufficient either to affect materially the porosity of the felt layer or materially to stiffen said layer, the laminated stiffener being impregnated throughout with a stiffening substance.

4. A shoe stiffener comprising an open mesh woven fabric layer, two layers of flimsy felt between which the fabric layer is located, the felt layers having fibers extending through the meshes of the fabric and felted together, and coatings of sizing on the exposed faces of the felt layers sufficient to bond the fibers thereof at and near said faces but insufficient either to affect materially the porosity of the felt layers or materially to stiffen said layers, the stiffener being impregnated throughout with a stiffening substance.

5. The method of making laminated sheet material for stiffeners of boots and shoes which comprises felting together in superposed relation a layer of fabric and a layer of flimsy felted fibrous material, and treating the felted material with a quantity of bonding substance sufficient to bond together the fibres of the felted material at and near the surface thereof only but insufficient either to affect materially the porosity of said material or materially to stiffen the felted material.

6. The method of making laminated sheet material for stiffeners of boots and shoes which comprises felting together in superposed relation a layer of fabric and a layer of flimsy felted fibrous material, treating the felted material with a quantity of bonding substance sufficient to bond together the fibres of the felted material at and near the surface thereof only but insufficient either to affect materially the porosity of said material or materially to stiffen it, and impregnating the material throughout, with a stiffening substance.

7. The method of making laminated sheet material for stiffeners of boots and shoes which comprises felting together in superposed relation a layer of fabric and a layer of flimsy felted fibrous material, treating the felted material with a quantity of bonding substance sufficient to bond together the fibres of the felted material at and near the surface thereof only but insufficient either to affect materially the porosity of said material or materially to stiffen it, and impregnating the material throughout, with a molten stiffening substance.

8. The method of making laminated sheet material for stiffeners of boots and shoes which comprises placing a layer of open-mesh woven fabric between partially felted layers of flimsy fibrous material, performing a felting operation to cause fibres of the two felt layers to work through the woven fabric, and applying to the exposed faces only of the felt layers a quantity of sizing insufficient either to affect materially the porosity of said layers or materially to stiffen them.

9. Laminated sheet material for use in making shoe stiffeners comprising a woven fabric layer, a layer of flimsy felt some of the fibres of which extend through the interstices of the fabric, and a coating of a bonding substance on the face only of the felt layer which is remote from the fabric layer sufficient to bond together the fibres of the felt layer at and near the surface of the felt layer and insufficient either to affect materially the porosity of said layer or materially to stiffen it.

10. Laminated sheet material for use in making shoe stiffeners comprising a woven fabric layer, two layers of flimsy felt between which the fabric base is located, some of the fibres of one felt layer extending through the interstices of the fabric and being interlaced with fibres of the other layer, and coatings of a bonding substance on the two exposed faces only of the felt layers sufficient to bond the fibres of the felt layers at and near the exposed surfaces thereof and insufficient either to affect materially the porosity of said layers or materially to stiffen them.

11. The method of making laminated sheet material for stiffeners of boots and shoes which comprises holding together in superposed relation a layer of comparatively strong fabric and a layer of flimsy felt of loose and open texture, spraying upon the exposed surface of the felt an amount of a non-thermoplastic sizing sufficient to bond the fibers of the felt at and near the surface thereof but insufficient to affect materially the porosity of the felt, and impregnating the laminated sheet with thermoplastic material.

LUCIEN PAUL MELLERIO.